US006947733B2

(12) United States Patent
Tillotson

(10) Patent No.: US 6,947,733 B2
(45) Date of Patent: Sep. 20, 2005

(54) METHOD AND APPARATUS FOR REDUCING SELF-INTERFERENCE IN A MOBILE NETWORK

(75) Inventor: Brian Jay Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 499 days.

(21) Appl. No.: 10/106,267

(22) Filed: Mar. 26, 2002

(65) Prior Publication Data

US 2004/0203716 A1 Oct. 14, 2004

(51) Int. Cl.[7] .................................................. H04Q 7/20
(52) U.S. Cl. ........................ 455/423; 455/561; 455/522; 455/67.11; 455/62; 455/562.1; 455/446; 455/447; 342/382
(58) Field of Search ................................ 455/561, 522, 455/562.1, 62, 67.11, 446, 447, 423, 424, 63.1, 67.13; 342/382; 370/208, 332, 130, 148, 150

(56) References Cited

U.S. PATENT DOCUMENTS

| | | | | |
|---|---|---|---|---|
| 5,457,560 A | * | 10/1995 | Sharpe et al. ............... | 398/100 |
| 5,809,401 A | * | 9/1998 | Meidan et al. .............. | 455/63.3 |
| 5,943,610 A | * | 8/1999 | Endo ........................... | 455/69 |
| 6,038,429 A | * | 3/2000 | Ahn ............................. | 455/72 |
| 6,101,399 A | * | 8/2000 | Raleigh et al. ............. | 455/561 |
| 6,240,275 B1 | * | 5/2001 | H'Mimy et al. .............. | 455/62 |
| 6,334,057 B1 | * | 12/2001 | Malmgren et al. .......... | 455/450 |
| 6,442,387 B1 | * | 8/2002 | Silventoinen et al. ....... | 455/436 |
| 6,490,442 B1 | * | 12/2002 | Billon ...................... | 455/226.1 |
| 6,535,747 B1 | * | 3/2003 | Shah et al. ................. | 455/522 |
| 6,647,000 B1 | * | 11/2003 | Persson et al. ............. | 370/330 |
| 6,650,872 B1 | * | 11/2003 | Karlsson .................. | 455/67.11 |
| 6,707,798 B1 | * | 3/2004 | Klein et al. ................. | 370/280 |

OTHER PUBLICATIONS

Ramanathan, Ram, On the Performance of Ad Hoc Networks with Beamforming Antennas, Internetwork Research Department, BBN Technologies, 2001.

* cited by examiner

Primary Examiner—William Trost
Assistant Examiner—Chuck Huynh
(74) Attorney, Agent, or Firm—Harness Dickey & Pierce P.L.C.

(57) ABSTRACT

A method for reducing interference in a mobile network in which a node A proposes a wireless link with node B. The method includes: (a) determining an angle between an incoming link from a node C to node B and the proposed node A to node B link, wherein the incoming link and the proposed link utilize the same frequency; (b) utilizing a nominal center of a beam of the proposed link, estimate an effective gain at node B to admit interference from the direction of node A into the incoming link from node C; (c) estimating a carrier intensity arriving at node B from node C; (d) determining a ratio of arriving node C to node B carrier to potential interference from the proposed node A to node B link; and (e) conditioning establishment of the proposed node A to node B link upon the determined ratio.

9 Claims, 10 Drawing Sheets

US 6,947,733 B2

METHOD AND APPARATUS FOR REDUCING SELF-INTERFERENCE IN A MOBILE NETWORK

CROSS-REFERENCE TO RELATED APPLICATIONS

This application is related to a copending application entitled "METHOD AND APPARATUS FOR AVOIDING SELF-INTERFERENCE IN A MOBILE NETWORK" by the same inventor, U.S. Ser. No. 10/106,422, filed on even date herewith and assigned to the same entity. The copending application is hereby incorporated by reference in its entirety.

FIELD OF THE INVENTION

The present invention relates to mobile communication systems and more particularly to methods and apparatus for reducing interference to and from other stations in a high-bandwidth radio communication network that includes airborne stations.

BACKGROUND OF THE INVENTION

Self-interference occurs in a high-bandwidth wireless communication network when radio frequency (RF) energy transmitted along one link in a network interferes with the reception of data on another link of the network. This self-interference problem has been addressed in terrestrial communication networks such as mobile telephones, where a cell and cluster network configuration is employed. However, this simple solution does not work well for networks with airborne nodes.

Terrestrial mobile networks (such as the public cellular telephone network) keep track of the location of mobile stations and their emissions and predict or detect significant changes in the environment and thus are able to respond before network conditions create serious self-interference problems. In some networks, such as the cellular telephone network, the distance between base stations is uniform, or at least unchanging. In addition, most surface-to-surface transmission paths are multipath transmission paths rather than line-of-sight, and are thus subject to an RF intensity drop-off proportional to the fourth power of distance. With uniform cell sizes and surface-to-surface multipath transmission paths, a lower bound to the carrier-to-interference ratio in network links can be guaranteed. Thus, even where there are large numbers of emitters in densely populated areas, the carrier-to-interference ratio of cellular telephone networks is bounded so that self-interference does not cripple the network. On the other hand, in networks with airborne emitters, transmission paths are line-of-sight and the intensity of emissions drops only as the square of distance, i.e., as $1/R^2$.

Let us assume that omnidirectional RF emitters are distributed with uniform density in an infinite, two-dimensional plane. Further assume that each emitter sends to receivers (for example, base stations in a cellular network) as far away as $R_0$, so that a minimum distance between emitters is $2R_0$. Thus, the average density of emitters on the plane is approximately $u=1/(\pi R_0^2)$. At distance $R_0$, the average intensity of each emitter is $I_0$.

In the case of multipath communication paths, where intensity drops as the fourth power of distance, it can be shown that an upper bound for the interference level at each base station is $I_0/4$. At other locations, it can be shown that the interference level is also bounded, albeit at a different, finite value. Thus, the interference level in a terrestrial network is bounded even though there are an infinite number of emitters at distances out to infinity under the above set of assumptions.

On the other hand, If it is assumed that the transmission paths in the plane are elevated above the earth sufficiently such that the communication paths are line of sight, it can be shown that the interference level at the location of an emitter is infinite, if it is assumed that there are an infinite number of emitters at distances out to infinity. More practically, it can be shown that the ratio of interference $I_i$ to carrier $I_0$ is the same as the ratio of the distance of a farthest emitter $x_{max}$ to $R_0$. This indicates that frequency reuse methods that work well in a terrestrial environment will not work well in an airborne RF environment.

Real airborne network nodes are not restricted to a two-dimensional plane. If it is assumed that emitters are distributed in a three-dimensional space, the power emitted by each emitter is still $P_e=4\pi I_0 R_0^2$, but the volumetric power density $\rho_p$ in three dimensions is $\rho_p=4\pi I_0 R_0^2/(4\pi R_0^3/3)=3 I_0/R_0$. The interference intensity at the location of an emitter is approximated by integrating over a three-dimensional spherical volume and can be shown to be $I_i=3 I_0(x_{max}-2R_0)/R_0$. This value is infinite when $x_{max}$ is infinite. In cases in which $x_{max}$ is finite but much larger than $2R_0$, the interference intensity $I_i$ approaches $3 I_0 x_{max}/R_0$, which is three times as bad as the two-dimensional case.

Self-interference levels in real airborne networks lie somewhere between the two-dimensional and three-dimensional airborne models, because movement of airplanes in the vertical direction is much more limited than movement in the horizontal direction. Thus, compact networks may encounter interference that scales more like the three dimensional airborne model, whereas more sparsely populated areas may experience interference that scales more like the two-dimensional model. As a result, more compact airborne networks may experience approximately three times the interference level of a more sparsely populated network. Although the use of narrow beams would help reduce interference levels in either case, the effect of the narrow beams would be to reduce interference by a linear scaling factor, not to reduce the order of the scaling laws.

SUMMARY OF THE INVENTION

One configuration of the present invention therefore provides a method for reducing interference in a mobile network in which a node A is to establish a proposed wireless link with node B. The method includes: (a) determining an angle between an incoming link from a node C to node B and the proposed node A to node B link, wherein the incoming link and the proposed link utilize the same frequency; (b) utilizing a nominal center of a beam of the proposed link, estimate an effective gain at node B to admit interference from the direction of node A into the incoming link from node C; (c) estimating a carrier intensity arriving at node B from node C; (d) determining a ratio of arriving node C to node B carrier to potential interference from the proposed node A to node B link; and (e) conditioning establishment of the proposed node A to node B link upon the determined ratio.

Another configuration of the present invention provides a wireless mobile network having mobile nodes, a node A, a node B, and at least one node C. Node B is configured to: (a) determine an angle between an incoming link from a node C to node B and a proposed node A to node B link, wherein the incoming link and the proposed link utilize the same frequency; (b) utilize a nominal center of a beam of the proposed link to estimate an effective gain at node B to admit interference into the link from node C to node B from the direction of node A; (c) estimate a carrier intensity arriving at node B from node C; (d) determine a ratio of arriving node C to node B carrier to potential interference from the proposed node A to node B link; and (e) condition establishment of the proposed node A to node B link upon the determined ratio.

Yet another configuration of the present invention provides a "node B" for use in a wireless mobile network. Node B is configured to: (a) determine an angle between an incoming link from a node C to a node B and a proposed node A to node B link, wherein the incoming link and the proposed link utilize the same frequency; (b) utilize a nominal center of a beam of the proposed link to estimate an effective gain at node B to admit interference from the direction of node A; (c) estimate a carrier intensity arriving at node B from node C; (d) determine a ratio of arriving node C to node B carrier to potential interference from the proposed node A to node B link; and (e) condition establishment of the proposed node A to node B link upon the determined ratio.

Provided in yet another configuration of the present invention is a "node B" for use in a wireless mobile network. Node B is configured to: receive a request for a node A to node B link from a node A; determine interference to a node C to node B link from every other possibly interfering link; rank determined interfering links of the other possibly interfering links in order of potential interference; sum interference to the node C to node B link from the node A to node B link and all determined interfering links providing less interference than the node A to node B link; and reject the node A to node B link depending upon whether or not the summed interference is greater than a node C to node B interference limit.

Yet another configuration of the present invention provides a "node B" for use in a wireless mobile network. Node B is configured to: determine a potential interference intensity of a proposed TDMA link with node A in all TDMA links from nodes C to node B using a TDMA-specific signal to noise ratio; determine whether the interference limit for each node C to node B TDMA link is exceeded by the proposed node A to node B link; for each node C to node B link for which the interference limit is exceeded, determine overlap times of the node A to node B link with the node C to node B link and remove, from a list of proposed time slots received from node A, any node A to node B burst that overlaps a node C to node B burst; and accept or disallow the proposed TDMA link with node A depending upon whether any slots remain in the proposed list of time slots.

Configurations of the present invention provide useful reductions in self-interference in wireless mobile, particularly in airborne wireless mobile communication networks. These reductions can be performed automatically, so that a large number of nodes can be provided in a highly mobile airborne network. In addition, some configurations of the present invention permit every non-interfering link to be formed. Because each narrow-beam link provides an opportunity to reuse spectrum, each additional link provides the opportunity to communicate additional data Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

As used herein, the designations "node A" and "node B" refer to nodes in the process of establishing a link. (A "link," as used herein, is a wireless communication path.) The designation "node C" refers to a node other than node A in communication with, or capable of communicating with node B. The designations "node D" and "node E" refer to two nodes other than nodes A and B in communication with each other, or capable of linking with one another, but not necessarily with node A or with node B. From the standpoint of node A and node B in a network, there may be zero, one, or a plurality of nodes C, zero, one or a plurality of nodes D, and zero, one, or a plurality of nodes E. In addition, there may be zero, one, or a plurality of nodes E for any particular node D, as any particular node D may be in communication with zero, one, or more other nodes. Additional nodes in the network may be denoted as "F" or "G" herein to emphasize their status as distinct nodes rather than their function with respect to nodes designated as A and B.

Figure 1:
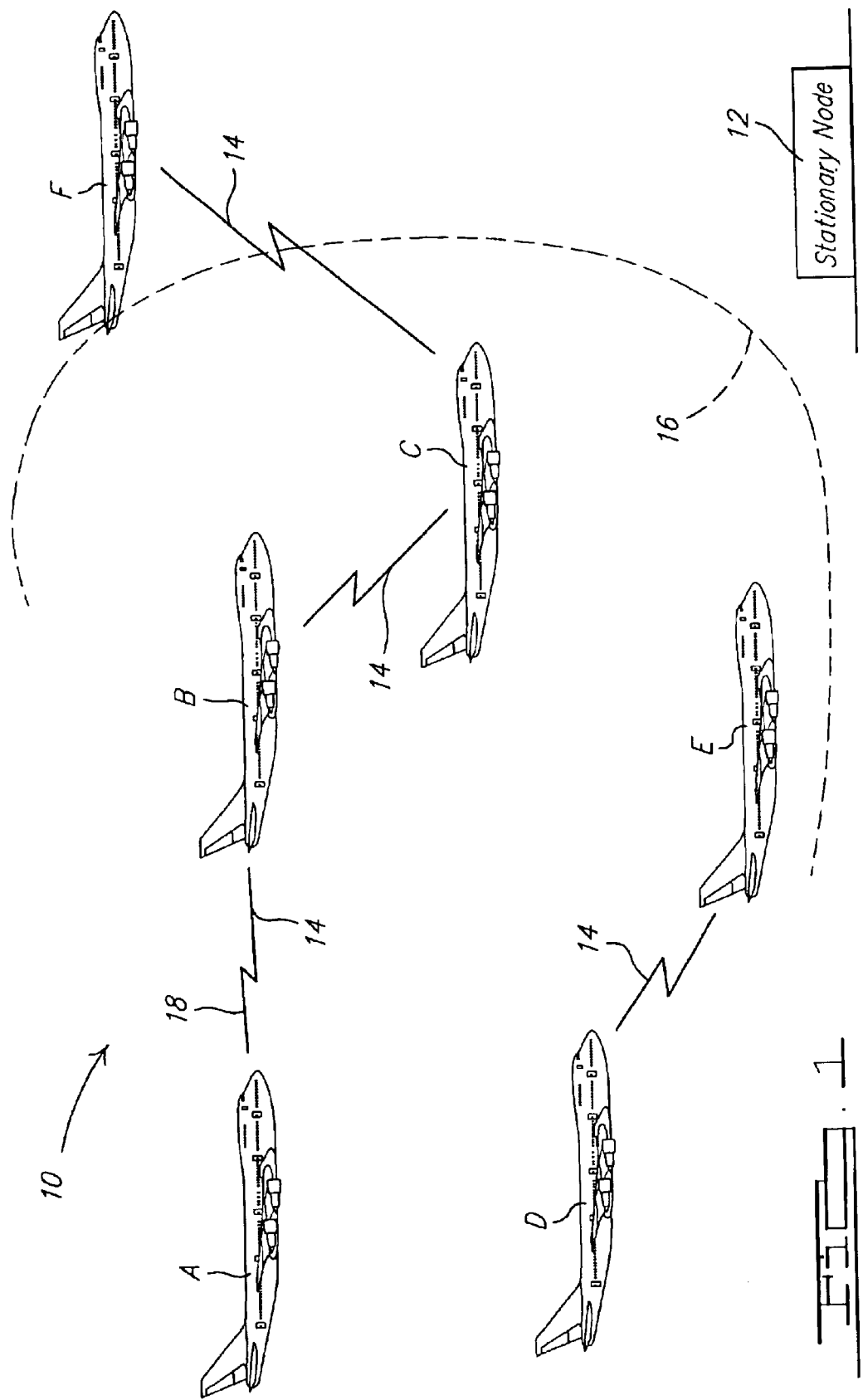
FIG. 1 is a simplified schematic representation of one configuration of an airborne network.

Referring to FIG. 1, a modern airborne network 10 comprises a plurality of nodes (i.e., transceivers) such as airborne nodes A, B, C, D, E, and F and a stationary node 12. In one configuration, stationary node 12 is a central node or controller. In another configuration, airborne network 10 is operable without a central node or controller and node 12 is not provided with central control functionality. Although node 12 is shown as a stationary node and nodes A, B, C, D, E, and F are shown as airborne nodes in FIG. 1, in general, there is no restriction on whether any particular node is stationary, mobile, or airborne. Also, although only one stationary node 12 is shown and only six other nodes A, B, C, D, E, and F are shown in FIG. 1, there is no limitation on the number of nodes in a network 10. In addition, stationary nodes such as node 12 are not required for operation of node 12, but one or more stationary nodes 12 may be present in particular configurations. In configurations of the present invention, some or all of nodes A, B, C, D, E and F in network 10 report their locations to other nodes. In one aspect of the present invention, to enhance self-interference avoidance, the location of each node A, B, C, D, E and F is reported to each other node either directly or indirectly via relay through one or more relay nodes. In addition, each node A, B, C, D, E, and F retains information about all other nodes.

Figure 2:
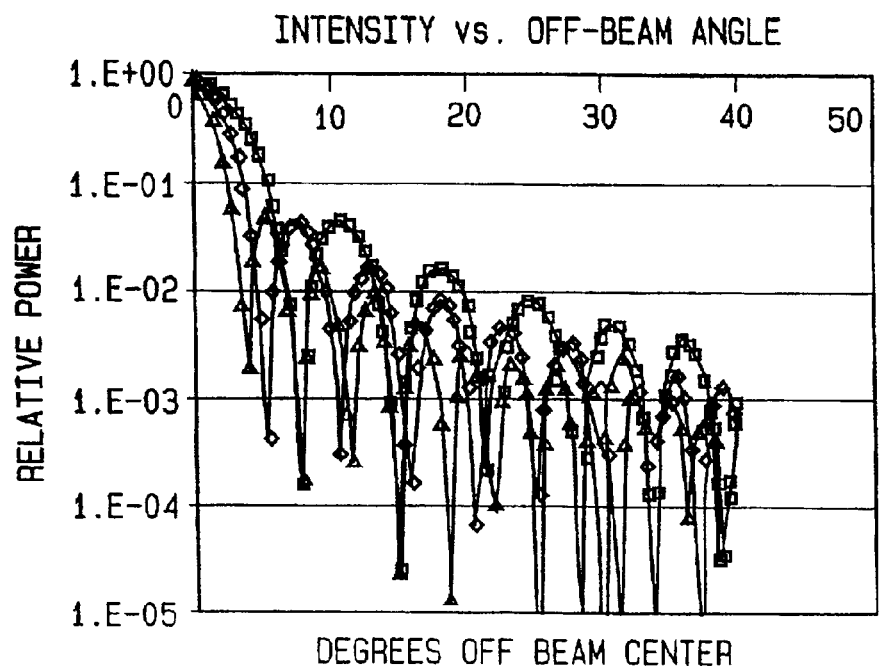
FIG. 2 is a graph of relative emitted power as a function of degrees off the beam center of a phased array antenna in one configuration of the present invention.
Figure 3:
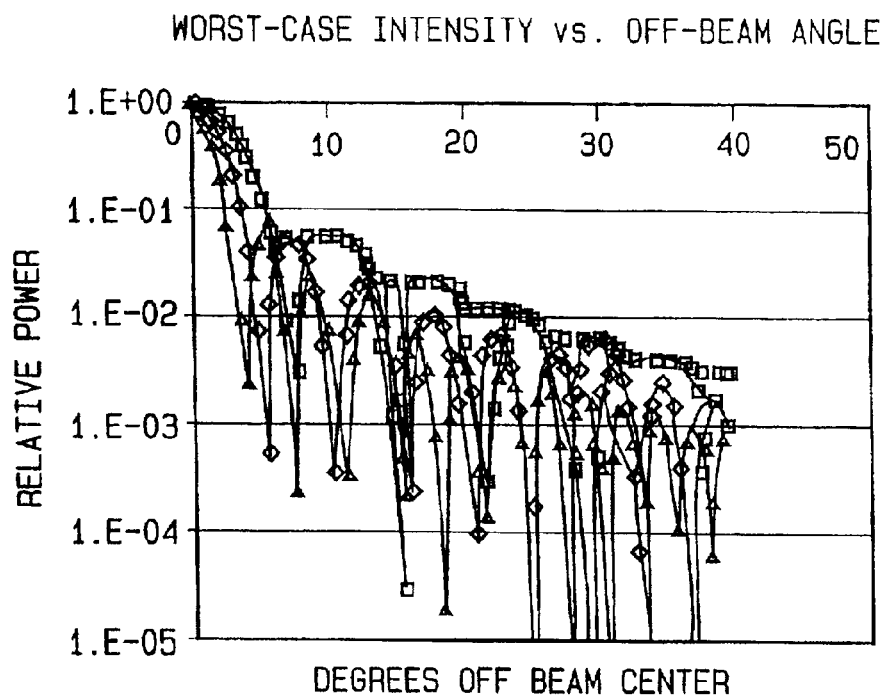
FIG. 3 is a graph showing "worst-case" beam power as a function of degrees off the beam center of a phased array antenna in one configuration of the present invention.

Nodes A, B, C, D, E, and F in network 10 utilize phased array antennas (PAA). Beams emitted by these antennas change their shape depending upon the direction that the beam is pointed. The shape change is a function of scan position in azimuth and elevation relative to the antenna itself. When interference comes from a source that is at an angle α off the beam center, the worst case of self-interference occurs when the gain at α0 is highest. For example and referring to FIG. 2, when α is 5 degrees, the worst case (i.e., maximum interference) occurs when the scan angle is 60 degrees. When α is 8 degrees, the worst-case scan angle is about 45 degrees. FIG. 3 is a graph showing "worst case" beams. More particularly, for each angle α off beam center, FIG. 3 shows the maximum gain observed at any scan angle from 0 to 60 degrees. In FIG. 2, triangles, diamonds, and squares show beam patterns at scan angles of zero degrees, forty-five degrees, and sixty degrees off boresight, respectively. The worst-case beams at each angle in FIG. 3, irrespective of scan angle, are shown by squares. (The beams illustrated here are idealized, in that the beam shape is taken as independent of whether a scan is in an azimuthal plane, and elevation plane, or some intermediate plane. In actuality, the beam shape would be different in azimuth than in elevation, and the effects of scan angle would differ depending upon whether the scan was in the plane of azimuth, elevation, or some intermediate plane.)

Figure 4:
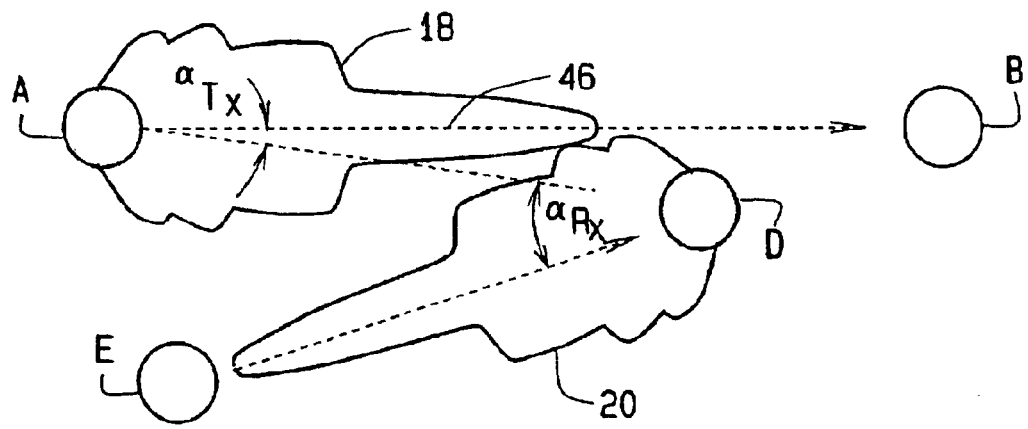
FIG. 4 is a representation of a configuration in which a proposed link from node A to node B impinges on a node D, which itself is communicating with node E (an ABDE case).

Referring to FIG. 4 (in which circles represent nodes), when a node A is potentially able to form a synchronous link with another node B, each node considers conditions that might preclude the link due to interference with other links. (By a "synchronous link," it is meant that the link is continuous rather than time division multiplexed.) Node A is configured with a node controller or computer (not shown) that, among other things described herein, assesses whether another node D might be within the worst-case transmit beam 18 from A to B. If there are no other nodes, there is nothing to do. Otherwise, referring to FIG. 5, to make this assessment, the computer applies 22 a user-selected rule for receive intensity vs. link range to determine the intensity node B expects to receive from node A. Examples of suitable rules include rules that specify a constant intensity at all receivers regardless of range, rules that specify that intensity falls as the reciprocal of range squared, and rules that specify the intensity falls as the reciprocal of range. The selected rule is implemented at each transmitter by controlling the power transmitted along each link so as to produce the rule-specified intensity at the intended receiving node. Known network parameters can be used to select a rule that provides optimum network performance under specified conditions. However, even in those cases in which a specified rule is not be "best" in optimizing performance, the use of a specified rule enables all nodes to agree on the intensity reaching the receiving node of any specified link.

Using both the determined intensity at B (which is nominally at the center of the RF beam transmitted from A) and a "worst case" beam, the computer at A estimates 24 the intensity of the potential interference illuminating node D. The computer at A then determines 26 whether any other node E transmits on the same frequency as the proposed A to B link and is potentially able to transmit to node D. Possibly there are none, in which case there is nothing to do. But if so, there is a potential for the proposed A to B link to interfere with a possible E to D link. The computer in A then applies 28 the worst-case beam for a receive antenna on D. More specifically, the computer in A assumes that the receive antenna on D is directed at E. The computer in A then computes the effective gain of the antenna on D with respect to interference coming from the antenna on A, given a worst case beam pattern. The result of this computation is the maximum amount of interference that A could inject into the E to D link.

The computer in A also applies 30 an intensity vs. link range rule to estimate the carrier intensity arriving at D from E. In one configuration, this intensity vs. link range rule is independent of rotation of any of the nodes under consideration. The ratio of the arriving E to D carrier to the potential interference from A is determined 32 and is the carrier-to-interference ratio for the node E to node D link that would result from the proposed A to B link. If this ratio is below 34 a specified carrier-to-interference limit, A rejects 36 the possible link to B because it would interfere with the E to D link. Otherwise, if 38 there are other "nodes E" (i.e., transmitting nodes) that might communicate with node D (i.e., a receiving node), the test is repeated for those nodes. Similarly, if there are other "nodes D" (i.e. receiving nodes) within the beam of node A, the test is repeated for these nodes. If the carrier-to-interference ratio is acceptable for all links on the A to B frequency having receiving nodes that are within the beam of the transmitter on A, then A sends 42 a request to B to form a link. This request can be sent via other nodes, if nodes A and B are already part of network 10 and can communicate indirectly via the other nodes. Otherwise, the request is part of the network joining process.

Figure 6:
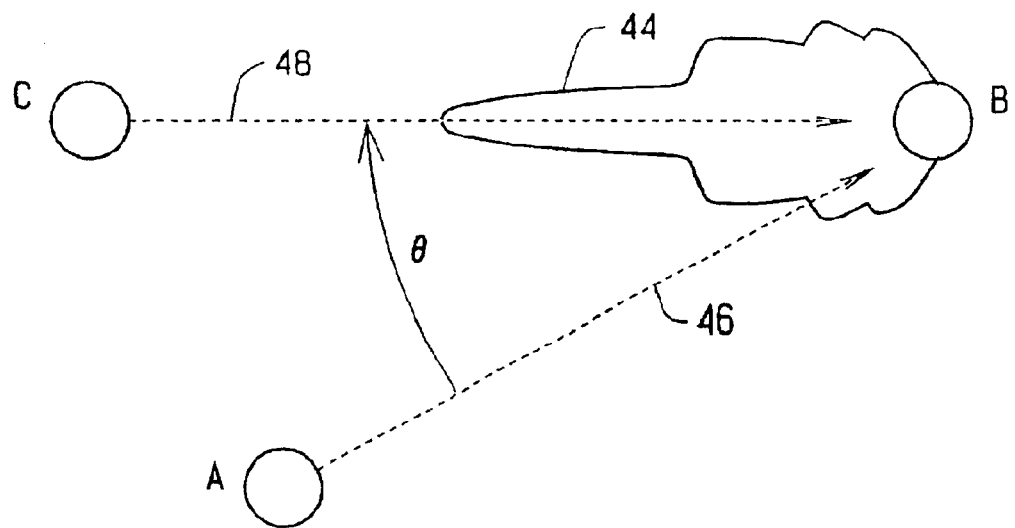
FIG. 6 is a representation of a configuration in which a proposed link from node A to node B interferes with another link in existence between node C and node B on the same frequency.
Figure 7:
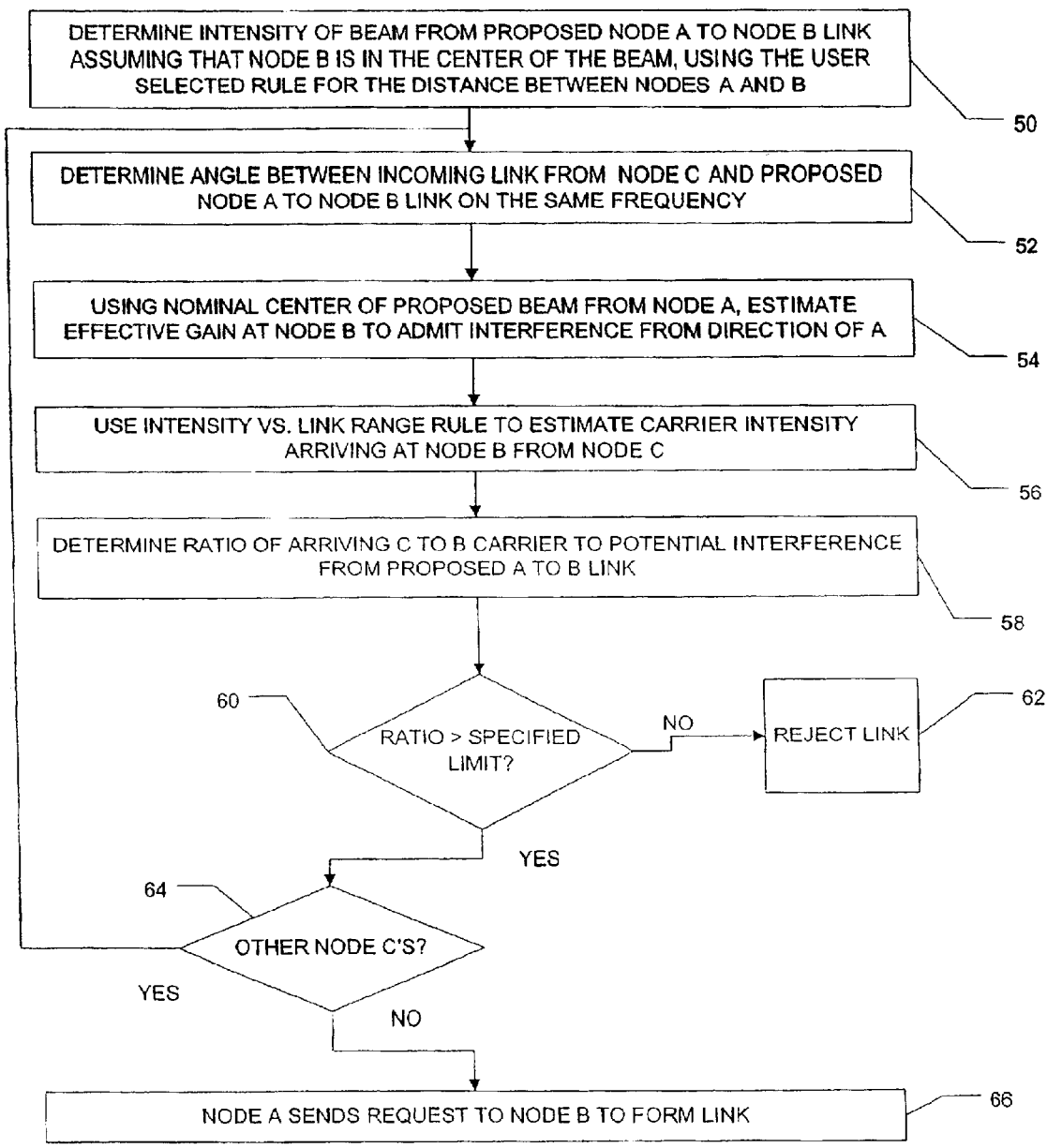
FIG. 7 is a flow chart of one configuration of a method performed at a node B of FIG. 4 to determine whether a proposed link from node A to node B is possible.

In one configuration and referring to FIG. 6 and FIG. 7, when node B gets the link request from A, the computer at node B considers a different condition that might preclude the link between A and B. A computer or node controller (not shown) in node B assesses whether the proposed link from A might interfere with links to B from any other node C. To make this assessment, the computer at node B assumes 50 that node B is at the nominal center 46 of a beam 18 (see FIG. 4) transmitted by node A, and that the intensity of the beam is as prescribed by the user-selected rule for the distance between nodes A and B. The computer at node B considers all of its incoming links 48 that are on the same frequency as the proposed A to B link. For each such link, the computer at node B determines 52 angle θ between the proposed A to B link 46 and the existing C to B link 46. The computer at node B uses the worst-case beam 44 of the receive antenna to estimate 54 the effective gain at node B to admit interference arriving from the direction of A into the incoming link from node C. The result is the maximum amount of interference that node A could inject into the C to B link. The computer in node B also uses the intensity vs. link range rule to estimate 56 the carrier intensity arriving at node B from node C. (This estimate need not be made if an actual measurement of the carrier intensity is available.) In one configuration, this intensity vs. link range rule is independent of the rotation of the nodes under consideration. The ratio of the arriving C to B carrier to the potential interference from node A is determined 58, and is the carrier-to-interference ratio. If this ratio 60 is below a specified carrier-to-interference limit, node B rejects 62 the possible link from A because it would interfere with the C to B link. If the carrier-to-interference ratio is acceptable for all links arriving at B, if 64 there are any other "node C's" (i.e., transmitting links to node B), the process is repeated for each link to determine whether any other such link would suffer excessive interference. If each link passes the carrier-to-interference ratio test, the proposed link from A to B is allowed 66.

The use of the "worst case" beam to predict interference ensures that self-interference levels will be low even when the airborne nodes rotate. More specifically, when a vehicle rotates (e.g., an airplane banks or turns), the phased array antenna on the vehicle must change the scan angle it uses to point its beam at a particular target. True beam patterns 18 could be used to predict interference, but doing so would require changing the estimate of interference whenever scan angles change. In some networks 10, links 14 may form and drop rapidly enough to make the network unstable. Using worst case beams to predict interference not only avoids having to change estimates of scan angles whenever a vehicle A rotates, but also assures that rotation of a vehicle A does not cause any link to exceed the limit for interference.

In another configuration, rather than a "worst-case" beam, an "X-percentile" beam is used for determination of whether a link can be established in steps 24 and 28. (The "worst-case" beam can be considered as being a "special case" of an X-percentile beam.) Net signal gain for a link or for interference includes antenna gains at both the transmitting node and the receiving node. For example, and referring to FIG. 4, an interference transmit angle $\alpha_{Tx}$ and an interference receive angle $\alpha_{Rx}$ are both non-zero, i.e., they are off the centers of their respective beams. Therefore, transmit gain and receive gain both vary with beam scan angle. Transmit gain is at its maximum, i.e., equal to the "worst-case" beam gain, only when the beam center is steered to certain scan angles. Most of the time, if the node A to node B transmit beam 18 happens to be at a scan angle such that gain in the node A to node D direction is maximal, the node E to node D receive beam at node D will not concurrently be at a scan angle that maximizes gain in a direction from node A to node D. Only by coincidence will the gain at the transmit end of a link 14 be maximized at the same time as the gain at the receive end is maximized.

As a result, the "worst-case" beam results in a calculated interference value that is rarely achieved. Such a conservative approach is appropriate for uses in which self-interference must not occur. For applications in which occasional self-interference can be tolerated in exchange for more aggressive link formation, more relaxed criteria such as the "X percentile beam" may be used, where the value "X" is preselected in accordance with a desired self-interference rate limit.

Thus, in one configuration using worst-case gain criteria, gain G is specified as a function of angle $\alpha$ off the center of the beam, with a value $G(\alpha)$ defined as a gain that is never exceeded at angle $\alpha$. In another configuration using X percentile gain criteria, gain at an angle $\alpha$ is defined as a gain that is exceeded less than X percent of the time, where X is a preselected value, for example, 95%. In networks in which the scan angles of different nodes are uncorrelated, the chance for both a node A to node B transmit beam and a node E to node D receive beam to exceed the ninety-fifth percentile gain at the same time is only $(1-0.95) \times (1-0.95) = 0.0025$. Thus, a configuration utilizing a 95th percentile beam produces self-interference only 0.25% of the time, while providing the advantage of permitting a higher probability of link formation. It will be appreciated that a 100th percentile beam is equivalent to the "worst case" beam.

The Xth percentile beam for a particular application is established, in one configuration, by estimating a fraction of time a typical phased array antenna beam spends at each scan angle, i.e., estimating the probability density function for the beam scan angle. In some configurations, this estimate is performed by analysis, simulation, or measurement during use, or even by educated guess. Utilizing a gain vs. $\alpha$ curve for each scan angle, a probability density function (p.d.f.) is determined for gain at each value of $\alpha$. A value $G_{X\%}(\alpha)$ of the X percentile beam is defined as the Xth percentile of the gain p.d.f. at each value of $\alpha$.

X percentile criteria are also used, in one configuration, in determining self-interference at node B. Referring to FIG. 6, an interfering beam from node A to node B is directly in the center of a beam. However, statistical variation can occur in the scan angle of the beam from node C to node B. Therefore, in one embodiment in which a 0.25% self-interference rate is accepted, a 99.75 percentile beam is used for estimation of interference in the circumstance illustrated in FIG. 6.

Extension of the X-percentile beam criteria to other self-interference rates is easily accomplished by noting that the situation in FIG. 4 gives rise to self-interference rates as $(1-X)^2$, whereas the situation in FIG. 6 gives rise to self-interference rates as $(1-X)$. Also, in one configuration, additional variables beyond phased array antenna beam angle are utilized to determine X percentile beams or worst-case beams. For example, pointing errors, beam coning (i.e., periodic pointing to each side of the nominal target to determine whether the target is actually in the expected location) and phased array element failure are taken into consideration.

In many cases, interference to any given link is not due a single interfering source. For example, the A to B link may not be the only source of interference to the C to B link. Instead, several links, including some links to node B and others links to other nodes, may contribute interference. Although no single link exceeds the interference limit for the C to B link, the total of all links could exceed the limit. Therefore, in one aspect of the present invention, a link prioritization process is used to ensure that a maximum tolerable subset of links is formed.

Figure 5:
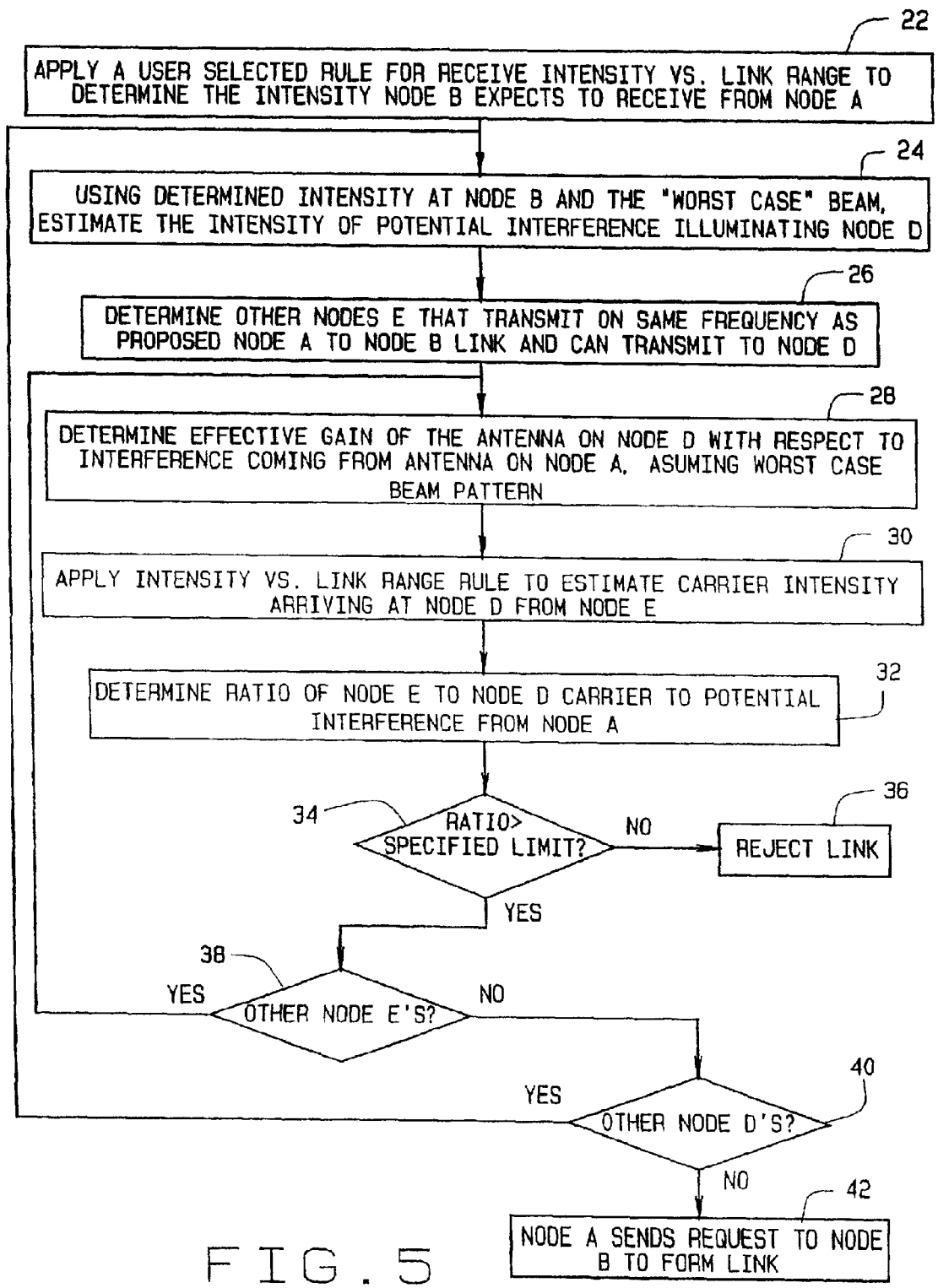
FIG. 5 is a flow chart of one configuration of a method performed at a node A of FIG. 4 to determine whether a proposed link from node A to node B is possible.

More particularly, to establish a proposed link from node A to node B, two classes of links are considered to which the A to B link might cause interference. One class of links includes those links that do not include node B. Immediately before requesting 66 a link with B (i.e., between deciding 64 that there are no other node C's and before sending the request at 66), and referring to FIG. 8, node A identifies 68 links on the proposed frequency to all other nodes except B. If 72 there are no links, node A sends 74 a request to node B for a link. Otherwise, a first link from the identified links (i.e., a possible "E to D" link) that could suffer interference as a result of the A to B link is selected 76. Using knowledge of locations and frequencies of all other nodes, node A identifies 78 all the other possible links that might impinge on node D other than the proposed A to B link. (For efficiency, links that contribute very little interference for an E to D link, such as those having beams originating far from D and that are directed away from D, are omitted in one configuration. In another configuration, a small margin is included in the allowable interference to accommodate such minor interference sources without explicitly determining and summing the value of the interference caused by these sources.) If 80 there are no other impinging links, the determination is made 82 using the method shown in FIG. 5 for node D of the node E to D link (i.e., when the result of test 38 in FIG. 5 is "no," return to 88 in FIG. 8 rather than perform test 40). Otherwise, node A ranks 84 these links in order of their potential interference to the E to D link, based on the interference criterion (intensity at D)×(receive gain)× (CDMA gain).

Using the ranked list thus obtained, A determines 86 a sum of interference for all interferers weaker than A to B, plus A to B itself. If 88 the resulting carrier-to-interference ratio (or the carrier-to-interference ratio determined in 82) is not acceptable, then the A to B link is prohibited 90 as a result of the E to D link. Otherwise, if 92 there are any remaining identified possible E to D links, the next E to D link is selected 94, and the process returns to step 78. Each E to D link is evaluated in this loop, and if step 90 is never reached, A sends 74 a request to node B for a link. Note that at 88, if the interference sum exceeds its limit the link should be prohibited, but if the carrier-to-interference ratio exceeds its limit the link should be permitted. The interference sum is in the denominator of the ratio, so the upper limit on interference becomes a lower limit for carrier-to-interference ratio.

Figure 8A:
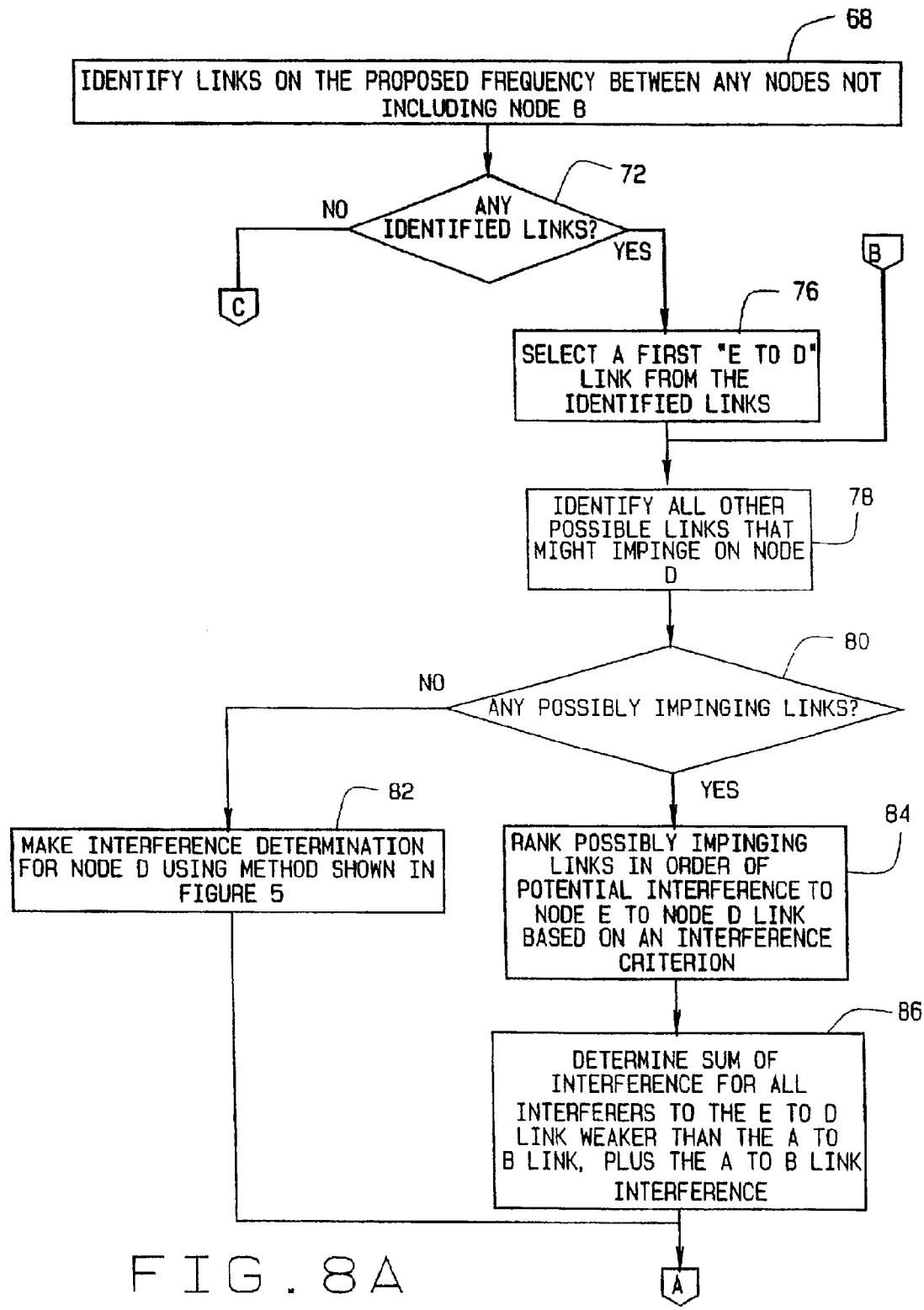
FIG. 8 is a flow chart of one configuration of a method performed at a node A of a network including at least one node E to node D link.
Figure 8B:
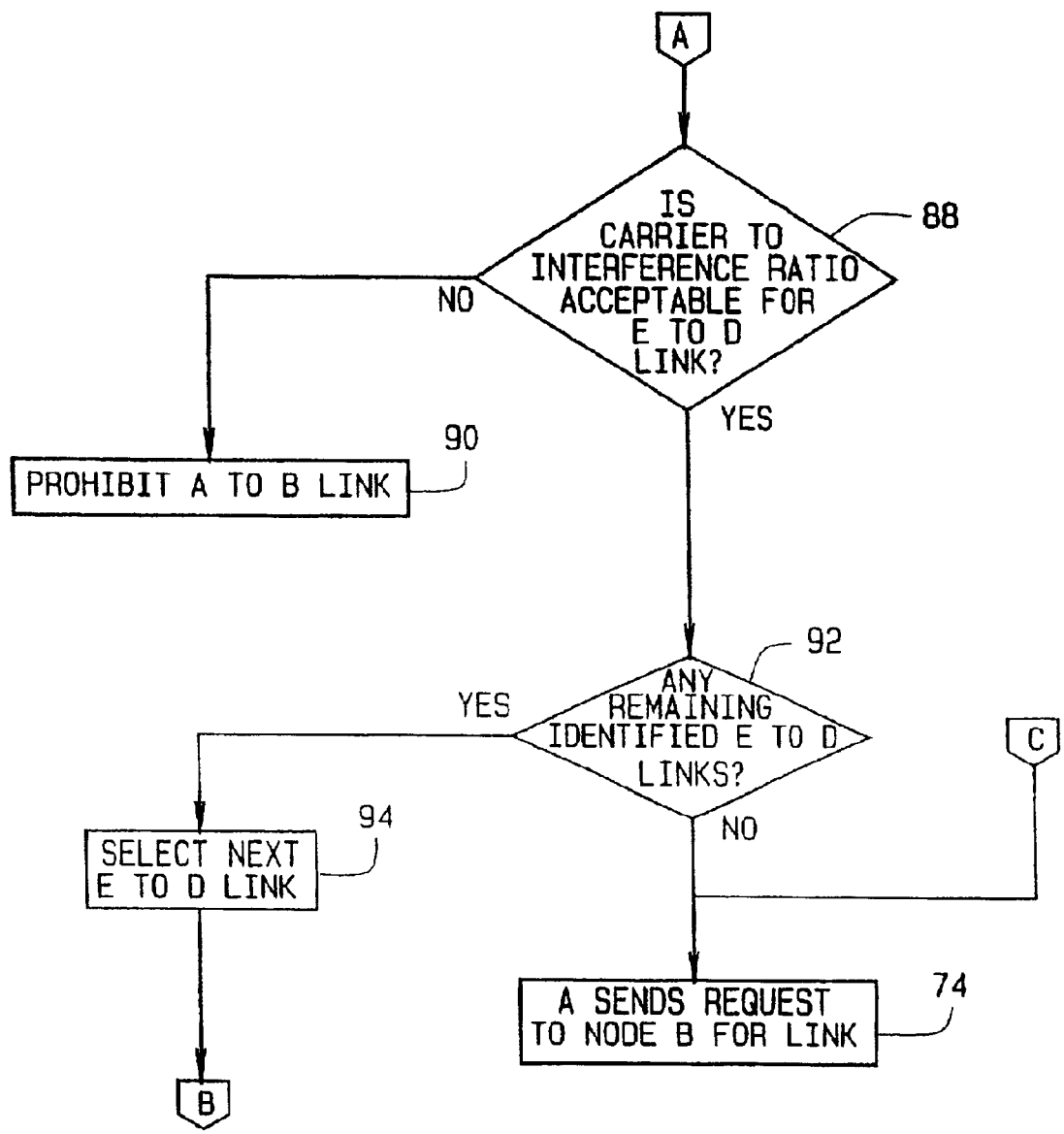

In determining whether the A to B link can be established in the configuration illustrated in FIG. 8, node A need not evaluate links that might interfere more strongly with the E to D link than the proposed A to B link. The reason is that other nodes perform similar determinations, and if their links would put E to D over the interference limit, those links are prohibited.

Figure 9:
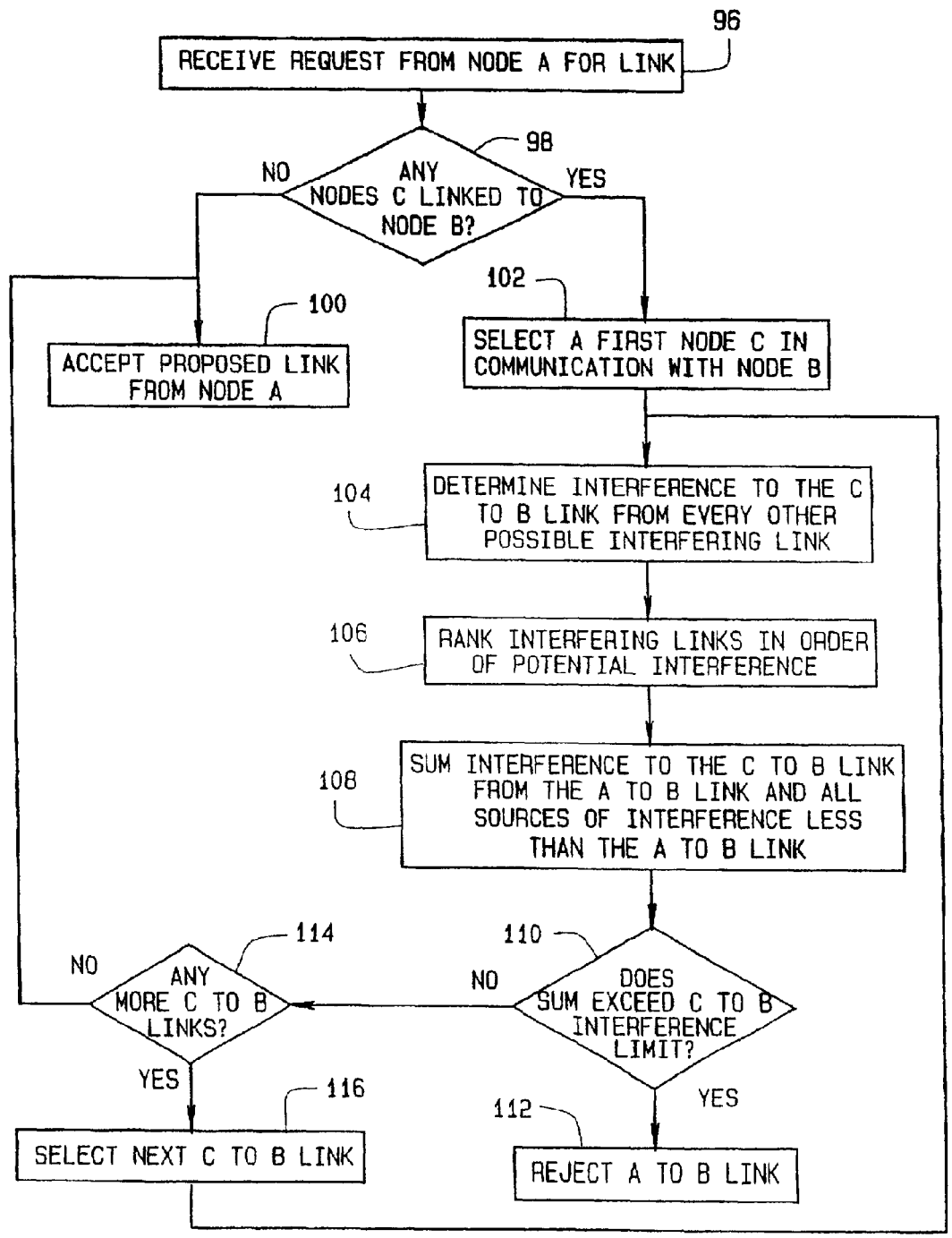
FIG. 9 is a flow chart of one configuration of a method performed at a node B of a network including at least one node C after having node B receives a request to form a link from node A of the method represented in FIG. 8.

If 92 the carrier to interference ratio is acceptable for all links on the A to B frequency having a receiving node that might be in the A to B beam, A sends 74 a request to B to form a link. Referring now to FIG. 9, when the request from A is received 96 at node B, node B determines potential interference with every other C to B link. First, node B determines whether there are any nodes C in communication with node B, and if not, node B accepts the link from node A. Otherwise, for each such C to B link, B determines the interference to the C to B link from other possible interfering links. (By "possible interfering links," what is meant in this context are other links to B or E to D links on the same frequency. Node B need not consider all possible links from other nodes to node B, because node B is aware of all of the possible links that actually exist, so node B can ignore those links that are possible but which do not actually exist.) Thus, in one configuration, node B selects 102 a first node C in communication with node B and determines 104 the interference to the C to B link from every other possible interfering link, including the A to B link. Node B ranks 106 all the other possible interfering links in order of their potential interference and then sums 108 the interference to the C to B link from all sources that interfere less than the A to B link and from the A to B link itself. (If there are no other interfering links to the C to B link except for the A to B link, then the sum is merely equal to the interference caused by the A to B link itself.) If 110 the proposed A to B link plus all weaker interference sources exceeds the interference limit for the C to B link, then the A to B link is prohibited 112. Otherwise, if 114 there are any other C to B links, node B selects 116 another C to B link and repeats the determination from step 104. If 114 all of the C to B links are determined not to have interference exceeding the limit, node B accepts 100 the proposed link from node A.

In another configuration, instead of immediately rejecting 90 an A to B link when it is prohibited by its potential interference with a D to E link (as in FIG. 8) further action is taken to possibly allow the link. In particular, when an A to B link would be prohibited 90 by its potential interference with a possible D to E link, node A sends a message to at least one of node D or node E asking whether the D to E link actually exists. If the D to E link does not exist, rather than prohibiting the link 90, the process simply resumes at step 92 of FIG. 8. Nodes D and E maintain a record of which nodes queried as to the existence of a possible D to E link. If node D received the query from node A and conditions later permit D and E to form a link, node D sends a message to node A (or to node B) warning that the D to E link is becoming active. Node A (or node B) then determines the interference caused by the A to B link plus other possible links again, and if the result is unacceptable, terminates the A to B link.

If the A to B link by itself does not exceed the interference limit for the possible D to E link, but the A to B link plus other possible links does exceed the limit at step 88, in another configuration, node A queries the existence of the D to E link as described above, and if it does not exist, the process continues at step 92. Otherwise, for each possible weaker interference link (e.g., node F to node G), node A sends a message to at least one of node F (i.e., the source of the link) or node G (i.e., the destination of the link) or both asking whether an F to G link actually exists. Node A queries each possible interference source, and if any such F to G link does not exist, that F to G link contribution is subtracted from the determined amount of interference to the D to E link, and the test at 88 is repeated for the revised interference level. This time, however, if the carrier to interference level is still not acceptable, the link is prohibited as at 90. All queried nodes maintain a record of which nodes asked about the possible F to G link. If, for example, node F received the query from node A, then if conditions later permit F and G to form a link, F sends a message to node A or to node B warning that the F to G link is becoming active. The node receiving the warning message (i.e., node A or node B) then recomputes the interference caused by the A to B link plus the F to G link and other possible links, and if the result is unacceptable, the A to B link is terminated.

In yet another configuration, all nodes of all currently active links in a network are continually informed of all currently active links in the network, and all interference calculations consider only currently active links, not all possible links, as in methods previously described. In one configuration, each node also periodically broadcasts a list of its currently active links to ensure that other nodes do not miss a report of links added or terminated. When any node receives a report of new links on the network, that node determines whether any of its own links would cause unacceptable interference to any of the new links. If so, that node terminates the interfering link. Reporting on links increases the overhead traffic needed to run the network, but the amount of additional traffic needed is not prohibitive, especially for slowly changing networks.

In networks in which code-division multiple access (CDMA) is used, interference between two CDMA-coded links depends in part on whether the two links have synchronized orthogonal codes, unsynchronized orthogonal codes, or non-orthogonal codes. All three types of links can be present and used between different nodes in a single network. Therefore, in one configuration of the present invention, the different levels of gain for each of the three combinations is taken into account in determining carrier to interference ratios.

More particularly, each node in one configuration of the present invention contains a data table listing three levels of gains for intrusion of one coded signal into another. The levels of gain correspond to (a) a case in which the two coded signals are synchronized and orthogonal with one another; (b) a case in which the two signals are unsynchronized and orthogonal; and (c) a case in which the two signals are non-orthogonal. The gain values in this data table are user-defined. The values depend upon the particular coding methods used, and, for synchronized codes, on the precision of available timing references.

If node A uses a single timing reference to chip its signal on all transmissions so that the outgoing links from node A are all synchronized to one another, and if each node uses orthogonal codes on each of its outgoing links, then the relative gain for an outgoing link from A (for example, an A to B link) to interfere with another outgoing link from A (for example, an A to C link) is the gain for synchronized orthogonal signals. In determining the interference of the A to B link in the A to C link, each node applies the synchronized orthogonal gain as well as the worst-case antenna gain and an appropriate gain for propagation loss.

If node A uses CDMA-coded links, it generally cannot synchronize the symbols on its outgoing links with the symbols on outgoing links from any other node C. More precisely, node A cannot ensure that the coding on its outgoing link will be synchronized with the coding on a link from C at every distant location (B or D) at which both signals are received. The reason is that the time-of-flight difference between the A to B link and the C to B link is generally not the same as the time-of-flight difference between the A to D link and the C to D link. In this case, if the links from A and from C use orthogonal codes, the relative gain for an outgoing link from node A to interfere with an outgoing link from C is the gain for unsynchronized orthogonal signals. In determining the interference of the A to B link in the C to B link, each node applies the unsynchronized orthogonal gain as well as the worst-case antenna gain and an appropriate gain for propagation loss.

If each node A in the network uses a code that is not orthogonal to the codes of some or all other nodes C in the network, the relative gain for an outgoing link from A (e.g. an A to B link) to interfere with an outgoing link from C (e.g. a C to B link) is the gain for non-orthogonal signals. In computing the interference of the A to B link in the C to B link, each node applies the non-orthogonal gain as well as the worst-case antenna gain and an appropriate gain for propagation loss. A value of unity can be used for the non-orthogonal gain when no coding is used or when two nodes use the same code.

In networks in which time-division multiple access (TDMA) is used, interference between two TDMA links depends in part upon whether bursts from the interfering link overlap the arrival interval of bursts on the intended carrier link. Individual time slots in a proposed TDMA sequence are permitted for use or denied for use depending upon whether each proposed time slot would interfere with a time slot on another TDMA link.

In TDMA networks in which nodes are highly mobile and TDMA slots are short, implementation of the TDMA self-interference reduction procedure for all links would require a large amount of communication among nodes. Therefore, in one configuration of the present invention utilizing a TDMA network, the TDMA self-interference reduction procedure is implemented only to assess whether a proposed link from node A to node B would interfere with links to B from any other node C.

Figure 10:
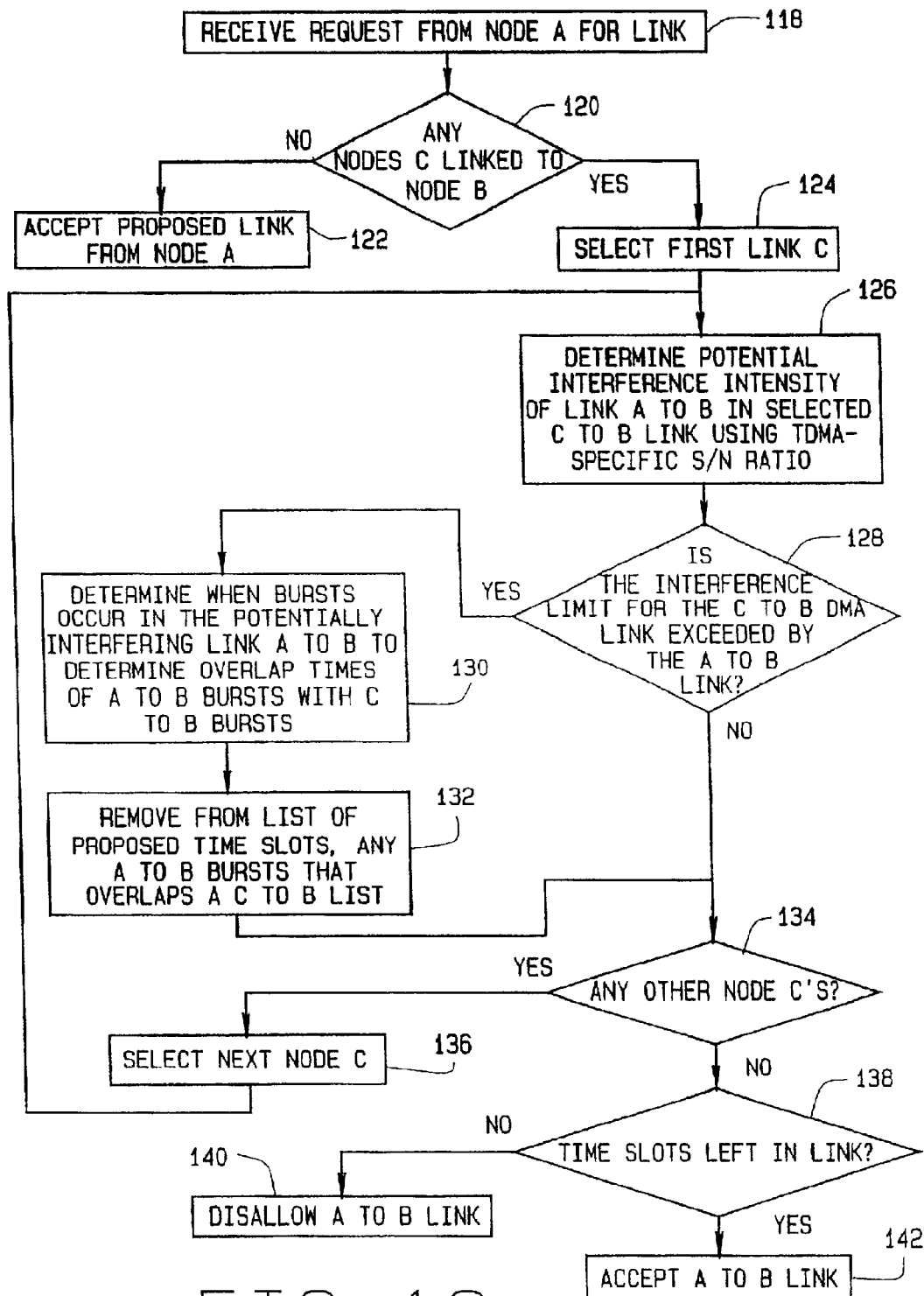
FIG. 10 is a flow chart of another configuration of a method performed at a node B in which TDMA links are used.

More specifically, in one configuration, before sending a link proposal to node B, node A considers whether the proposed link would interfere with any other link from a node E to a node D, assuming that both links are synchronous, i.e., that both links are active 100% of the time. If the proposed node A to node B link does not exceed the interference limit for any link from a node E to a node D, then node A sends a TDMA link proposal to node B. Referring to FIG. 10, for a proposed A to B link using TDMA, the link proposal sent by A is received 118 by node B. This link proposal includes a list of time slots in which node B would receive bursts from node A. If 120 node B is not linked with any other nodes C, the link proposal is accepted 122. Otherwise, for all other C to B links that node B receives, node B determines a potential interference intensity of link A to B in the C to B link under consideration. In one configuration, node B selects 124 a first link C and determines 126 the potential interference intensity of link A to B in the selected C to B link. In some configurations, a TDMA link may require a different S/N than a continuous link. Thus, in configurations in which TDMA links require a different signal-to-noise (S/N) ratio than always-on links (e.g., a higher S/N ratio), node B applies a TDMA-specific S/N ratio to determine whether the proposed A to B link would exceed 128 the interference limit for the C to B TDMA link. The present invention does not exclude the use of additional factors in making this determination in other configurations. Such factors can include, for example, link prioritization factors and gain factors for CDMA usage. If node B determines that that the A to B link exceeds the interference limit for the C to B link, node B determines 130 when bursts occur in the potentially interfering link A to B to determine overlap times of A to B bursts with C to B bursts. Each A to B burst that overlaps a C to B burst is removed 132 from the list of proposed time slots. If 134 there are any other nodes C, the next node C is selected 136, and the process returns to step 126. Similarly, if the interference limit for the C to B TDMA link is not exceeded by the A to B link, and if there are any other nodes C, the next node C is selected, and the process returns to step 126. Otherwise, if 138 there are no time slots left in the list, the link is prohibited 140. If there are time slots left in the list, the link from A to B is allowed 142.

In one configuration, a message requesting a proposed A to B link includes a list of available receive and available transmit slots for the link. In addition, B obtains information about the distance between A and B so that possible overlaps in the existing C to B time slots can be determined. The distance information is provided, in this configuration, by A transmitting its location to B as part of the link establishment request. Other suitable methods may be used to obtain distance information, for example, radar, global positioning satellite (GPS) positioning, etc. If overlap in the arrival time of bursts from A to B and bursts from C to B can be completely avoided, the link can be established, unless the establishment of the link is prohibited because it would interfere with a link other than C to B. Also, if there is no overlap of bursts, it is not necessary to compute gains and interference ratios to determine a level of interference.

Figure 11:
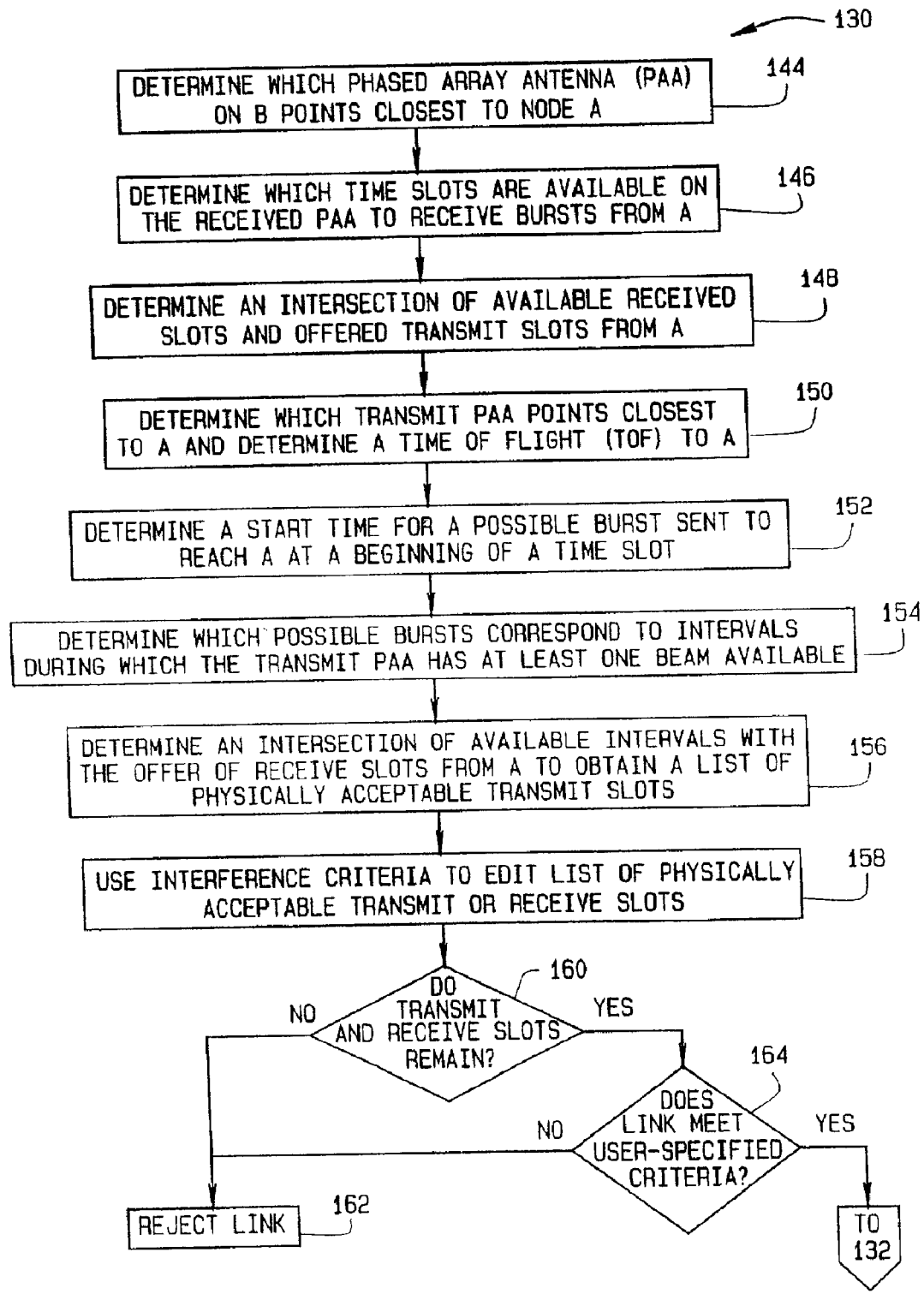
FIG. 11 is a configuration of a method used by node B to determine overlap of A to B bursts with C to B bursts, as is done by node B in the configuration represented by FIG. 10.

In one configuration and referring to FIG. 11, to determine 130 overlap of A to B bursts with C to B bursts, B first determines 144 which receive phased array antenna (PAA) points closest to A. Next, B determines 146 which time slots are available on the receive PAA to receive bursts from A. B then determines 148 the intersection of available receive slots and the offered transmit slots from A. The slots in this intersection comprise a list of physically acceptable receive slots. B then determines 150 which transmit PAA points closest to A, and determines a "time of flight" (TOF) to A, i.e., a propagation time delay between transmission from B to reception by A. Each TDMA cycle includes S time slots, so in one configuration in which a duplex (two-way) link is formed, for each of the S time slots in a cycle, B determines 152 a start time for possible bursts sent to reach A at a beginning of a time slot. Next, B determines 154 which of those possible bursts correspond to intervals during which the transmit PAA has at least one beam available. B determines 156 an intersection of those available intervals (each of which corresponds to a time slot at A) with the offer of receive slots from A, the result of which comprises a list of physically acceptable transmit slots. The interference criteria (non-overlap or acceptable S/N ratio in the link from node C to node B) is then used to edit 158 the lists of physically acceptable receive slots, i.e., to remove any slots that would result in unacceptable interference in the existing C to B link. In one configuration, if 160 no transmit or no receive slots remain, B rejects 162 the proposed link. B then applies 164 user-specified criteria to determine whether to accept or reject the proposed A to B link. If the A to B link meets user-specified criteria, the process continues at step 132 of FIG. 10. In another configuration, B rejects the proposed link if not enough time slots are available in either the transmit or the receive direction to provide acceptable communication quality.

The above-described configuration is applicable in cases in which two TDMA links are received at node B. In another configuration, two TDMA links transmitted from node A are considered, one from node A to node B and another from node A to node D, and the proposed A to B link may interfere with the existing A to D link. If node D is within the worst case beam of the A to B link, node A is configured to exclude TDMA slots from the proposed A to B link that overlap (at the transmit end, i.e., node A) any TDMA slots for the A to D link. Aside from ensuring that the A to D link does not interfere with the A to B link, this configuration also ensures that the A to B link does not interfere with the A to D link. In addition, this configuration ensures that interference from both the A to B and A to D links do not occur simultaneously to any other link.

In a highly mobile environment, it may not be possible to arrange TDMA time slots to avoid overlap of possibly interfering links. Thus, in such environments in cases in which a proposed link from node A to node B may create interference in a link from node E to node D, one configuration of the present invention simply prevents the A to B link from being formed if the interference level from the proposed link from A to B would be greater than that allowed in the E to D link, ignoring TDMA time slots. In another configuration, the level of interference allowed is TDMA-specific, but time slots are still ignored.

In less mobile environments and in one configuration of the present invention, when an A to B link is prohibited by potential interference to a link E to D (based on worst case beams and appropriate CDMA gain), node A queries node E or node D to obtain a list of time slots used by the E to D link. Node A then excludes from the proposed A to B link any time slots that would cause a burst from node A to overlap any bursts from node E arriving at node D. The node receiving the query from node A (i.e., either node D or node E) maintains a record of those nodes that have queried about time slots in the E to D link. For the remainder of the discussion of this configuration, it shall be assumed that node D received the query. If conditions later require a change of slots in the E to D link, node D, as the node having received the query from node A, sends a message to A describing the new slot assignment and the time at which the new slot assignment is to become active. Nodes A and B then renegotiate slots for the A to B link to avoid overlap with the new set of E to D bursts, assuming that the A to B link is still active and could still interfere with the node E to node D link. If the result is unacceptable (i.e., no other time slots are available for A to B, or not enough to maintain a desired communication quality), the A to B link is terminated by node A.

Interference calculations are performed periodically at each node. As nodes move, links that were previously unacceptable may become acceptable. Conversely, links that have already been formed may become unacceptable. In one configuration, links that have become unacceptable are terminated to avoid self-interference. Simulations of interference calculations with laptop computers in 2001 utilizing lookup tables for worst-case beam patterns have been performed. These simulations indicate that a network node with comparable computing power could perform all of the calculations necessary for forming (or breaking) a link in well under one second, which is more than adequate for most networks. A lowest acceptable update frequency can be determined by simulation of, or data from, any specific network.

The various configurations of the present invention provide reductions in self-interference in wireless mobile, and more particularly airborne wireless mobile communication networks. These reductions are performed automatically, so that a large number of nodes can be provided in a highly mobile airborne network. In addition, in at least one aspect, every non-interfering link can be formed. Because each narrow-beam link provides an opportunity to reuse spectrum, each additional link provides the opportunity to communicate additional data.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for reducing interference in a mobile network in which a node A is to establish a proposed wireless link with node B, said method comprising:

(a) determining an angle between an incoming link from a node C to node B and the proposed node A to node B link, wherein the incoming link and the proposed link utilize the same frequency;

(b) utilizing a nominal center of a beam of the proposed link to estimate an effective gain at node B to admit interference from the direction of node A into the incoming link from node C;

(c) estimating a carrier intensity arriving at node B from node C;

(d) determining a ratio of arriving node C to node B carrier to potential interference from the proposed node A to node B link; and (e) conditioning establishment of the proposed node A to node B link upon the determined ratio.

2. A method in accordance with claim 1 wherein said estimating a carrier intensity arriving at node B from node C comprising using a selected rotation-independent intensity vs. link range rule to estimate the carrier intensity.

3. A method in accordance with claim 1 further comprising iterating steps (a), (b), (c), (d), and (e) for each node C.

4. A wireless mobile network having mobile nodes, said network including a node A, a node B, at least one node C, and wherein node B is configured to:
   (a) determine an angle between an incoming link from a node C to node B and a proposed node A to node B link, wherein the incoming link and the proposed link utilize the same frequency;
   (b) utilize a nominal center of a beam of the proposed link to estimate an effective gain at node B to admit interference into the link from node C to node B from the direction of node A;
   (c) estimate a carrier intensity arriving at node B from node C;
   (d) determine a ratio of arriving node C to node B carrier to potential interference from the proposed node A to node B link; and
   (e) condition establishment of the proposed node A to node B link upon the determined ratio.

5. A network in accordance with claim 4 wherein to estimate a carrier intensity arriving at node B from node C, node B is configured to utilize a selected rotation-independent intensity vs. link range rule to estimate the carrier intensity.

6. A network in accordance with claim 4 wherein node B is configured to iterate (a), (b), (c), (d), and (e) for each node C.

7. A "node B" for use in a wireless mobile network, said node B configured to:
   (a) determine an angle between an incoming link from a node C to a node B and a proposed node A to node B link, wherein the incoming link and the proposed link utilize the same frequency;
   (b) utilize a nominal center of a beam of the proposed link to estimate an effective gain at node B to admit interference from the direction of node A;
   (c) estimate a carrier intensity arriving at node B from node C;
   (d) determine a ratio of arriving node C to node B carrier to potential interference from the proposed node A to node B link; and
   (e) condition establishment of the proposed node A to node B link upon the determined ratio.

8. A "node B" in accordance with claim 7 wherein to estimate a carrier intensity arriving at node B from node C, node B is configured to utilize a selected rotation-independent intensity vs. link range rule to estimate the carrier intensity.

9. A "node B" in accordance with claim 7 configured to iterate (a), (b), (c), (d), and (e) for each node C.

* * * * *